US012585691B2

(12) United States Patent
Rakshit et al.

(10) Patent No.: US 12,585,691 B2
(45) Date of Patent: Mar. 24, 2026

(54) PERSONALIZED PRESENTATION CONTENT CONSUMPTION IN A VIRTUAL REALITY (VR) ENVIRONMENT

(71) Applicant: International Business Machines Corporation, Armonk, NY (US)

(72) Inventors: Sarbajit K. Rakshit, Kolkata (IN); Sudheesh S. Kairali, Kozhikode (IN); Binoy Thomas, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 18/224,797

(22) Filed: Jul. 21, 2023

(65) Prior Publication Data

US 2025/0028753 A1 Jan. 23, 2025

(51) Int. Cl.
| | |
|---|---|
| *G06F 16/438* | (2019.01) |
| *G06F 3/04815* | (2022.01) |
| *G06F 16/435* | (2019.01) |
| *G06F 16/483* | (2019.01) |

(Continued)

(52) U.S. Cl.
CPC ...... *G06F 16/4393* (2019.01); *G06F 3/04815* (2013.01); *G06F 16/435* (2019.01); *G06F 16/483* (2019.01); *G06T 13/40* (2013.01); *G06T 19/003* (2013.01)

(58) Field of Classification Search
CPC ............................ G06F 16/4393; G06T 13/40
See application file for complete search history.

(56) References Cited

U.S. PATENT DOCUMENTS

| | | | | |
|---|---|---|---|---|
| 10,684,769 | B2 * | 6/2020 | Yamat | G06F 3/0488 |
| 11,010,176 | B2 | 5/2021 | Cavallo et al. | |
| 11,295,511 | B1 * | 4/2022 | Yosifov | G06T 11/206 |

(Continued)

FOREIGN PATENT DOCUMENTS

| | | |
|---|---|---|
| KR | 102045748 B1 | 11/2019 |
| WO | 2022221186 A1 | 10/2022 |

OTHER PUBLICATIONS

Rijnsburger et al., Personalized presentation annotations using optical HMDs, 2017 (Year: 2017).*

(Continued)

*Primary Examiner* — Phong X Nguyen
(74) *Attorney, Agent, or Firm* — James L. Olsen

(57) ABSTRACT

One embodiment of the invention provides a method for personalized presentation content consumption in a virtual reality (VR) environment. The method comprises receiving a presentation file, determining metadata corresponding to the presentation file, creating a plurality of virtual presentation slides based on the metadata, and arranging the virtual presentation slides in the VR environment based on the metadata. The metadata identifies a plurality of sections of the presentation file. Each virtual presentation slide comprises a VR object representing one of the sections. The method further comprises providing the VR environment for display on a VR-enabled device of a user, receiving VR interaction data indicative of one or more VR interactions of the user in the VR environment, and personalizing presentation of the presentation content in the VR environment based on the VR interaction data, such that the user views the virtual presentation slides in a different order than another user.

20 Claims, 5 Drawing Sheets

600

Receiving a presentation file comprising presentation content ⌐601

Determining metadata corresponding to the presentation file, where the metadata comprises information identifying a plurality of sections of the presentation file ⌐602

Creating a plurality of virtual presentation slides based on the metadata, wherein each virtual presentation slide comprises a virtual reality (VR) object representing a section of the plurality of sections ⌐603

Arranging the plurality of virtual presentation slides in a VR environment based on the metadata ⌐604

Providing the VR environment for display on a VR-enabled device of a user ⌐605

Receiving VR interaction data indicative of one or more VR interactions of the user in the VR environment ⌐606

Personalizing presentation of the presentation content in the VR environment based on the VR interaction data, such that the user views the plurality of virtual presentation slides in a different order than another user ⌐607

(51) Int. Cl.
G06T 13/40 (2011.01)
G06T 19/00 (2011.01)

(56) References Cited

U.S. PATENT DOCUMENTS

| | | | | |
|---|---|---|---|---|
| 11,947,893 | B1 * | 4/2024 | Seth | G06F 3/0481 |
| 11,948,253 | B2 * | 4/2024 | Boufarhat | H04L 12/1827 |
| 11,954,778 | B2 * | 4/2024 | Silverstein | G06T 13/80 |
| 12,073,362 | B2 * | 8/2024 | Platt | H04L 65/1069 |
| 2009/0002377 | A1 * | 1/2009 | Lee | G06T 13/40 |
| | | | | 345/473 |
| 2009/0327899 | A1 * | 12/2009 | Bress | G06Q 10/10 |
| | | | | 715/757 |
| 2010/0023849 | A1 * | 1/2010 | Hakim | H04L 12/6418 |
| | | | | 715/202 |
| 2010/0238179 | A1 * | 9/2010 | Kelly | G01W 1/10 |
| | | | | 345/473 |
| 2011/0029885 | A1 * | 2/2011 | Camenisch | G06F 3/04815 |
| | | | | 715/744 |
| 2011/0161837 | A1 * | 6/2011 | Betzler | G06Q 10/10 |
| | | | | 715/757 |
| 2014/0096036 | A1 | 4/2014 | Mohler | |
| 2014/0282013 | A1 * | 9/2014 | Amijee | G06F 3/0482 |
| | | | | 715/732 |
| 2014/0298179 | A1 * | 10/2014 | Chen | G06F 3/0481 |
| | | | | 715/730 |
| 2016/0142674 | A1 * | 5/2016 | Travis | H04L 65/403 |
| | | | | 348/14.07 |
| 2016/0300387 | A1 * | 10/2016 | Ziman | G06F 3/165 |
| 2018/0253219 | A1 | 9/2018 | Dotan-Cohen et al. | |
| 2019/0236622 | A1 * | 8/2019 | Swanson | G06F 16/9536 |
| 2019/0265945 | A1 * | 8/2019 | Newell | G06F 3/167 |
| 2020/0174745 | A1 * | 6/2020 | Jung | G06F 3/04812 |
| 2022/0066542 | A1 | 3/2022 | Laaksonen et al. | |
| 2023/0127438 | A1 * | 4/2023 | Karadayi | G06T 17/005 |
| | | | | 345/419 |
| 2024/0029339 | A1 * | 1/2024 | Krol | G06T 15/20 |
| 2024/0371089 | A1 * | 11/2024 | Yang | G10L 15/26 |
| 2025/0028753 | A1 * | 1/2025 | Rakshit | G06F 16/483 |

OTHER PUBLICATIONS

Pazour, P.D., et al. "Virtual Reality Conferencing", 2018 IEEE International Conference on Artificial Intelligence and Virtual Reality (AIVR), pp. 84-91, IEEE Computer Society, United States.

Horst, R. et al., "Presenters in Virtual Reality in Slideshow Presentations", Research Gate, Oct. 2020, p. 1-9, downloaded Jun. 23, 23 from: https://www.researchgate.net/publication/344457774_Presenters_in_Virtual_Reality_in_Slideshow_Presentations/citation/download, United States.

Ortiz et al., "How Extended Reality will reshape commerce", Retrieved from: https://www.ibm.com/downloads/documents/us-en/10c31775c8d402b0, Dec. 2019, 8 pages.

Unknown, "AR and VR in the workplace", Retrieved from: https://web.archive.org/web/20220808105131/https://www.ibm.com/thought-leadership/institute-business-value/report/ar-vr-workplace, Retrieved on: Aug. 8, 2022, 7 pages.

* cited by examiner

100

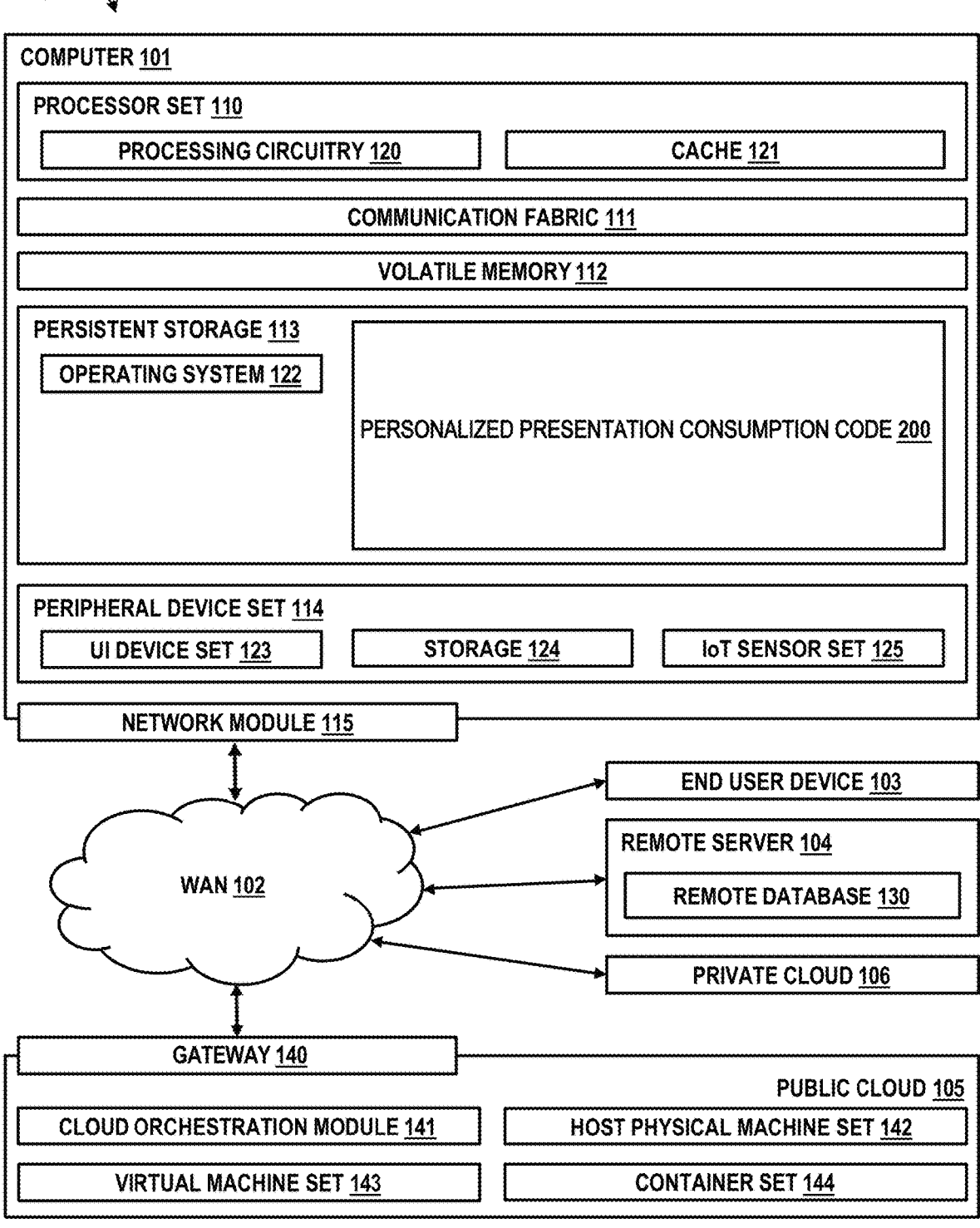

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

PERSONALIZED PRESENTATION CONSUMPTION CODE 200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

PERSONALIZED PRESENTATION CONTENT CONSUMPTION IN A VIRTUAL REALITY (VR) ENVIRONMENT

BACKGROUND

Embodiments of the invention generally relate to virtual reality (VR) environments, and more specifically, personalized presentation content consumption in a VR environment.

VR is the use of computer technology to create a simulated environment known as a VR environment. A VR environment comprises a VR model of an environment (e.g., a physical environment), and simulates the presence of a user in the environment. A VR environment may be displayed on VR devices such as VR headsets. A VR headset is a head-mounted device that displays a VR environment to a wearer of the VR headset. VR headsets are widely used with VR video games but also used in other applications, including simulators and trainers. A wearer of a VR headset may interact with a VR environment displayed using the VR headset and/or VR accessories such as controllers, hand trackers, etc.

SUMMARY

One embodiment of the invention provides a method for personalized presentation content consumption in a VR environment. The method comprises receiving a presentation file comprising presentation content, and determining metadata corresponding to the presentation file. The metadata comprises information identifying a plurality of sections of the presentation file. The method further comprises creating a plurality of virtual presentation slides based on the metadata, and arranging the plurality of virtual presentation slides in the VR environment based on the metadata. Each virtual presentation slide comprises a VR object representing a section of the plurality of sections. The method further comprises providing the VR environment for display on a VR-enabled device of a user, and receiving VR interaction data indicative of one or more VR interactions of the user in the VR environment. The method further comprises personalizing presentation of the presentation content in the VR environment based on the VR interaction data, such that the user views the plurality of virtual presentation slides in a different order than another user. Other embodiments include a system for personalized presentation content consumption in a VR environment, and a computer program product for personalized presentation content consumption in a VR environment. These features contribute to the advantages of customizing/personalizing an amount of time a user wants to spend viewing (i.e., focusing on) a virtual presentation slide, and further customizing/personalizing an order in which the user views virtual presentation slides.

One or more of the following features may be included.

In some embodiments, each section of the plurality of sections comprises a slide or a page of the presentation file.

In some embodiments, the VR-enabled device comprises a VR headset.

In some embodiments, the metadata further comprises additional information identifying at least one of the following: a total number of the plurality of sections, a break time assigned to the presentation file, each content type included in each section of the plurality of sections, each presenter assigned to explain or narrate each section of the plurality of section, and each information topic each section of the plurality of section covers.

In some embodiments, a plurality of virtual presenter avatars is created based on the metadata, and, in response to the user selecting a virtual presentation slide of the plurality of virtual presentation slides to view, a virtual presenter avatar corresponding to the selected virtual presentation slide is displayed in a portion of the VR environment. Each virtual presenter avatar comprises a VR object representing a presenter assigned to explain or narrate a section of the plurality of sections. Each virtual presenter avatar corresponds to a virtual presentation slide of the plurality of virtual presentation slides representing a section of the plurality of sections.

In some embodiments, it is determined whether the user and the another user are simultaneously viewing the same virtual presentation slide of the plurality of virtual presentation slides, and, in response to determining the user and the another user are simultaneously viewing the same virtual presentation slide, at least one of a communication channel or a collaboration tool is provided to facilitate collaboration and discussion between the user and the another user.

In some embodiments, a plurality of virtual participant avatars is created based on the metadata, and the plurality of virtual participant avatars is displayed in the VR environment. Each virtual participant avatar comprises a VR object representing a virtually present participant viewing the same VR environment. A position of each virtual participant avatar in the VR environment adjusts based on a current virtual activity of a virtually present participant that the virtual participant avatar represents.

In some embodiments, the plurality of virtual presentation slides is arranged on a plurality of virtual walls in the VR environment, and all virtual presentation slides that include the same content type are arranged on the same virtual wall.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 1 depicts a computing environment according to an embodiment of the present invention;

Figure 2:
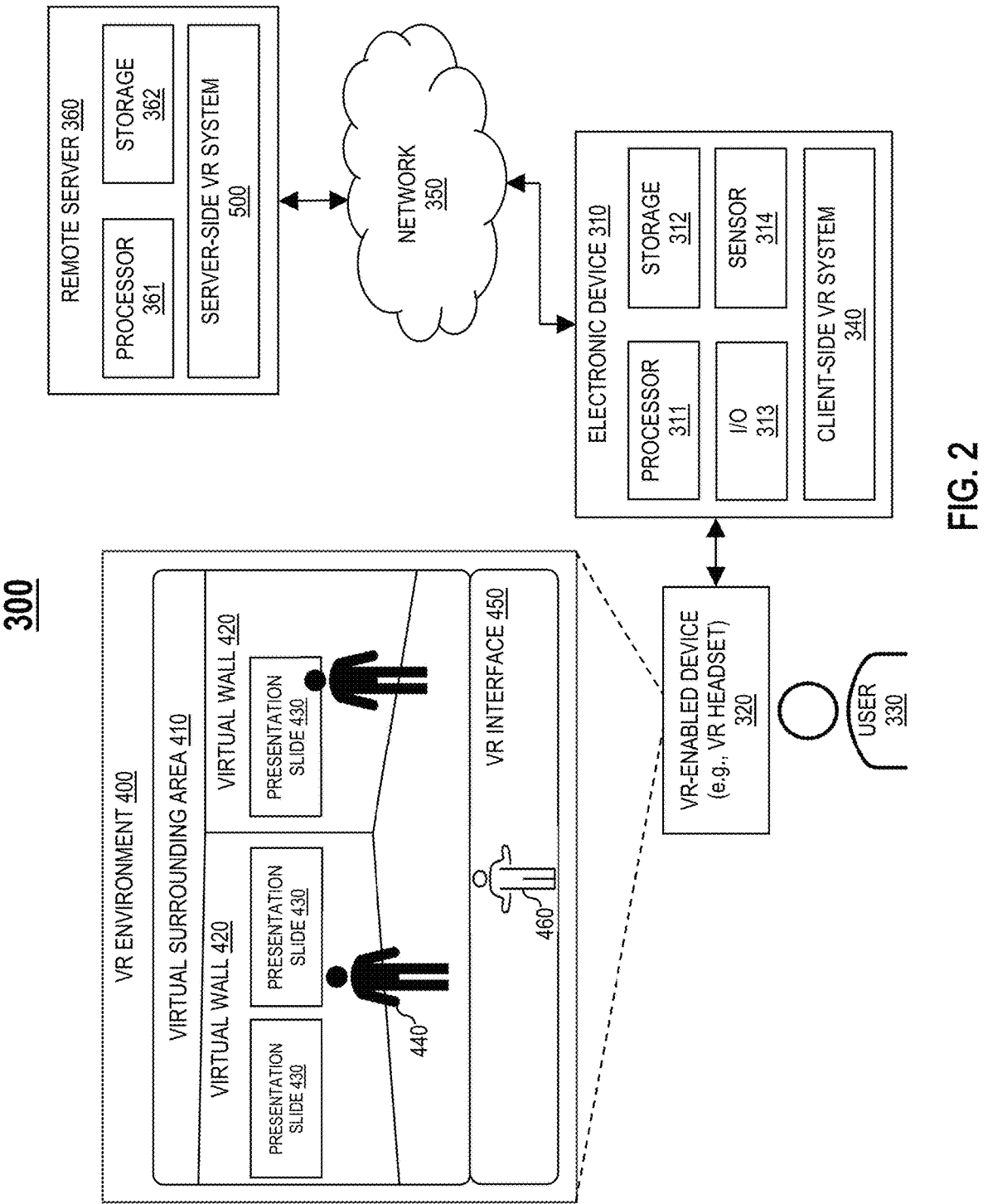
FIG. 2 illustrates an example computing architecture for implementing personalized presentation content consumption in a virtual reality (VR) environment, in accordance with an embodiment of the invention.

The detailed description explains the preferred embodiments of the invention, together with advantages and features, by way of example with reference to the drawings.

DETAILED DESCRIPTION

Embodiments of the invention generally relate to virtual reality (VR) environments, and more specifically, personalized presentation content consumption in a VR environment. One embodiment of the invention provides a method for personalized presentation content consumption in a VR environment. The method comprises receiving a presentation file comprising presentation content, and determining metadata corresponding to the presentation file. The metadata comprises information identifying a plurality of sections of the presentation file. The method further comprises creating a plurality of virtual presentation slides based on the metadata, and arranging the plurality of virtual presentation slides in the VR environment based on the metadata. Each virtual presentation slide comprises a VR object representing a section of the plurality of sections. The method further comprises providing the VR environment for display on a VR-enabled device of a user, and receiving VR interaction data indicative of one or more VR interactions of the user in the VR environment. The method further comprises personalizing presentation of the presentation content in the VR environment based on the VR interaction data, such that the user views the plurality of virtual presentation slides in a different order than another user. These features contribute to the advantages of customizing/personalizing an amount of time a user wants to spend viewing (i.e., focusing on) a virtual presentation slide, and further customizing/personalizing an order in which the user views virtual presentation slides.

Another embodiment of the invention provides a system for personalized presentation content consumption in a VR environment. The system comprises at least one processor and a processor-readable memory device storing instructions that when executed by the at least one processor causes the at least one processor to perform operations. The operations include receiving a presentation file comprising presentation content, and determining metadata corresponding to the presentation file. The metadata comprises information identifying a plurality of sections of the presentation file. The operations further include creating a plurality of virtual presentation slides based on the metadata, and arranging the plurality of virtual presentation slides in the VR environment based on the metadata. Each virtual presentation slide comprises a VR object representing a section of the plurality of sections. The operations further include providing the VR environment for display on a VR-enabled device of a user, and receiving VR interaction data indicative of one or more VR interactions of the user in the VR environment. The operations further include personalizing presentation of the presentation content in the VR environment based on the VR interaction data, such that the user views the plurality of virtual presentation slides in a different order than another user.

In some embodiments, each section of the plurality of sections comprises a slide or a page of the presentation file.

In some embodiments, the VR-enabled device comprises a VR headset.

In some embodiments, the metadata further comprises additional information identifying at least one of the following: a total number of the plurality of sections, a break time assigned to the presentation file, each content type included in each section of the plurality of sections, each presenter assigned to explain or narrate each section of the plurality of section, and each information topic each section of the plurality of section covers.

In some embodiments, a plurality of virtual presenter avatars is created based on the metadata, and, in response to the user selecting a virtual presentation slide of the plurality of virtual presentation slides to view, a virtual presenter avatar corresponding to the selected virtual presentation slide is displayed in a portion of the VR environment. Each virtual presenter avatar comprises a VR object representing a presenter assigned to explain or narrate a section of the plurality of sections. Each virtual presenter avatar corresponds to a virtual presentation slide of the plurality of virtual presentation slides representing a section of the plurality of sections.

In some embodiments, it is determined whether the user and the another user are simultaneously viewing the same virtual presentation slide of the plurality of virtual presentation slides, and, in response to determining the user and the another user are simultaneously viewing the same virtual presentation slide, at least one of a communication channel or a collaboration tool is provided to facilitate collaboration and discussion between the user and the another user.

In some embodiments, a plurality of virtual participant avatars is created based on the metadata, and the plurality of virtual participant avatars is displayed in the VR environment. Each virtual participant avatar comprises a VR object representing a virtually present participant viewing the same VR environment. A position of each virtual participant avatar in the VR environment adjusts based on a current virtual activity of a virtually present participant that the virtual participant avatar represents.

In some embodiments, the plurality of virtual presentation slides is arranged on a plurality of virtual walls in the VR environment, and all virtual presentation slides that include the same content type are arranged on the same virtual wall.

One embodiment of the invention provides a computer program product personalized presentation content consumption in a VR environment. The computer program product comprises a computer readable storage medium having program instructions embodied therewith. The program instructions are executable by a processor to cause the processor to receive a presentation file comprising presentation content, and determine metadata corresponding to the presentation file. The metadata comprises information identifying a plurality of sections of the presentation file. The program instructions are executable by the processor to further cause the processor to create a plurality of virtual presentation slides based on the metadata, and arrange the plurality of virtual presentation slides in the VR environment based on the metadata. Each virtual presentation slide comprises a VR object representing a section of the plurality of sections. The program instructions are executable by the processor to further cause the processor to provide the VR environment for display on a VR-enabled device of a user, and receive VR interaction data indicative of one or more VR interactions of the user in the VR environment. The program instructions are executable by the processor to further cause the processor to personalize presentation of the presentation content in the VR environment based on the VR interaction data, such that the user views the plurality of virtual presentation slides in a different order than another user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as personalized presentation content consumption code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A VR interaction is a virtual activity or a virtual movement that a user of a VR-enabled device performs in a VR environment.

FIG. 2 illustrates an example computing architecture 300 for implementing personalized presentation content consumption in a VR environment, in accordance with an embodiment of the invention. The computing architecture 300 comprises an electronic device 310. The electronic device 310 comprises computation resources such as, but not limited to, one or more processor units 311 and one or more storage units 312.

In one embodiment, the electronic device 310 comprises a VR-enabled device 320 integrated in or coupled to the electronic device 310. For example, in one embodiment, the VR-enabled device 320 is a VR headset 320. A user 330 may utilize a VR headset 320 by wearing the VR headset 320 on the head.

Examples of an electronic device 310 include, but are not limited to, a desktop computer, a mobile electronic device (e.g., a tablet, a smart phone, a laptop, etc.), a wearable device (e.g., a smart watch, a VR headset 320, etc.), an Internet of Things (IoT) device, etc.

In one embodiment, the electronic device 310 comprises one or more input/output (I/O) units 313 integrated in or coupled to the electronic device 310/VR-enabled device 320, such as a keyboard, a keypad, a touch interface, a display screen, a hand tracker, etc. The user 330 may utilize an I/O unit 313 to configure one or more user preferences, configure one or more parameters, provide user input, etc.

In one embodiment, the electronic device 310 comprises one or more sensor units 314 integrated in or coupled to the electronic device 310/VR-enabled device 320, such as a motion sensor, an image sensor (e.g., a camera), a temperature sensor, a proximity sensor, a pressure sensor, an accelerometer sensor, a gyroscope sensor, a sound sensor (e.g., a microphone), a GPS, etc. Real-time raw sensor data relating to the user 330 may be collected via a sensor unit 314.

One or more applications may execute/operate on the electronic device 310 utilizing the computation resources of the electronic device 310. In one embodiment, the one or more applications on the electronic device 310 include, but are not limited to, a client-side VR system 300. The client-side VR system 340 is configured to provide, via the VR-enabled device 320 (e.g., a VR headset 320), a VR environment 400 comprising one or more visualizations of a presentation to an audience (e.g., a presentation to attendees of a conference, a presentation to invitees of a meeting, etc.). The user 330 may view the VR environment 400 using the VR-enabled device 320.

In one embodiment, the VR environment 400 includes one or more virtual presentation slides 430 arranged on one or more virtual walls 420 of a virtual surrounding area 410. Each virtual presentation slide 430 is a VR object representing a slide or page (i.e., section) of presentation content (e.g., a pitch deck, a slide deck, a multi-page document, etc.). As described in detail later herein, the user 330 can view (i.e., consume) the one or more virtual presentation slides 430 in a personalized manner based on one or more VR interactions of the user 330 in the VR environment 400.

Each user 330 viewing the VR environment 400 using a VR-enabled device 320 represents a participant who is virtually present at the presentation ("virtually present participant"). In one embodiment, the VR environment 400 includes one or more virtual participant avatars 440. Each virtual participant avatar 440 is a VR object representing a virtually present participant. If there are multiple virtually present participants (i.e., multiple users 330 simultaneously viewing the VR environment 400), the VR environment 400 includes multiple virtual participant avatars 440 representing the virtually present participants.

As described in detail later herein, the user 330 can perform one or more virtual movements in the VR environment 400. Specifically, the user 330 can virtually move towards (i.e., approach) a VR object (e.g., a virtual presentation slide 430, a virtual participant avatar 440) in the VR environment 400 by providing user input collected by an I/O device 313 and/or performing a movement-based user gesture detected by a sensor device 314.

For example, to focus on a presentation slide 430 arranged on a virtual wall 420, the user 330 virtually moves in a direction towards the virtual wall 420 until the virtual presentation slide 430 is within proximity of the user 330, and selects the presentation slide 430 for viewing. The user 330 can select a presentation slide 330 for viewing by providing user input collected by an I/O device 313 and/or performing a movement-based user gesture detected by a sensor device 314. When the user 330 selects a presentation slide 430 for viewing, the selected virtual presentation slide 430 is enlarged/magnified/zoomed in to allow the user 330 to view (i.e., focus on) the selected virtual presentation slide 430.

In one embodiment, the VR environment 400 includes a VR interface 450. In one embodiment, the VR interface 450 is positioned at a peripheral of the VR environment 400, such as at the bottom, on the side, or at the top of the VR environment 400. When the user 330 selects a presentation slide 430 for viewing, the VR interface 450 displays a virtual presenter avatar 460 for presenting (i.e., explaining or narrating) content of the selected virtual presentation slide 430 to the user 330. In one embodiment, as a virtual presenter avatar 460 is displayed on the VR interface 450, a voice recording is simultaneously played back to the user 330, wherein the voice recording represents a voice of the virtual presenter avatar 460 and provides an explanation or narration.

In one embodiment, the VR environment 400 provides one or more communication channels (e.g., voice, chat, etc.) and/or one or more collaboration tools (e.g., a collaborative whiteboard tool, a note-taking tool).

Each virtual presenter avatar 460 is a VR object representing a presenter assigned to present (i.e., explain or narrate) content of a slide or page (i.e., section) of presentation content. Each presentation slide 430 has a corresponding virtual presenter avatar 460. If multiple presenters are assigned to present different slides or pages of presentation content, different virtual presentation slides 430 corresponding to the different slides or pages have different corresponding virtual presenter avatars 460.

In one embodiment, the electronic device 310/VR-enabled device 320 is configured to exchange data with a remote server 360 over a communications network/connection 350 (e.g., a wireless connection such as a Wi-Fi connection or a cellular data connection, a wired connection, or a combination of the two).

In one embodiment, the remote server 360 comprises computation resources, such as one or more processor units 361 and one or more storage units 362. One or more applications that provide higher-level services may execute/operate on the remote server 360 utilizing the computation resources of the remote server 360. In one embodiment, the one or more applications on the remote server 360 include, but are not limited to, a server-side VR system 500 configured to exchange data with a plurality of electronic devices 310 and/or a plurality of VR-enabled devices 320 (e.g., a plurality of VR headsets 320).

VR interaction data of a user 330 is indicative of one or more VR interactions of the user 330 in a VR environment 400.

In one embodiment, the server-side VR system 500 (in FIG. 3) is configured to: (1) receive VR interaction data of a user 330 (e.g., from an electronic device 310/VR-enabled device 320), (2) analyze the VR interaction data to determine one or more VR interactions of the user 330 in a VR environment 400, and (3) personalize, for the user 330, presentation of presentation content in the VR environment 400 based on the one or more VR interactions of the user 330, such that the user 330 can view (i.e., consume) one or more virtual presentation slides 430 in the VR environment 400 in a personalized manner. As described in detail later herein, the server-side VR system 500 is configured to analyze the VR interaction data to determine a current virtual activity and/or a next virtual activity of the user 330 in the VR environment 400 (e.g., which virtual presentation slide 430 the user 330 is currently viewing, which other virtually present participant 440 the user 330 is currently interacting with, which virtual presentation slide 430 the user 330 intends to view next, etc.).

Figure 3:
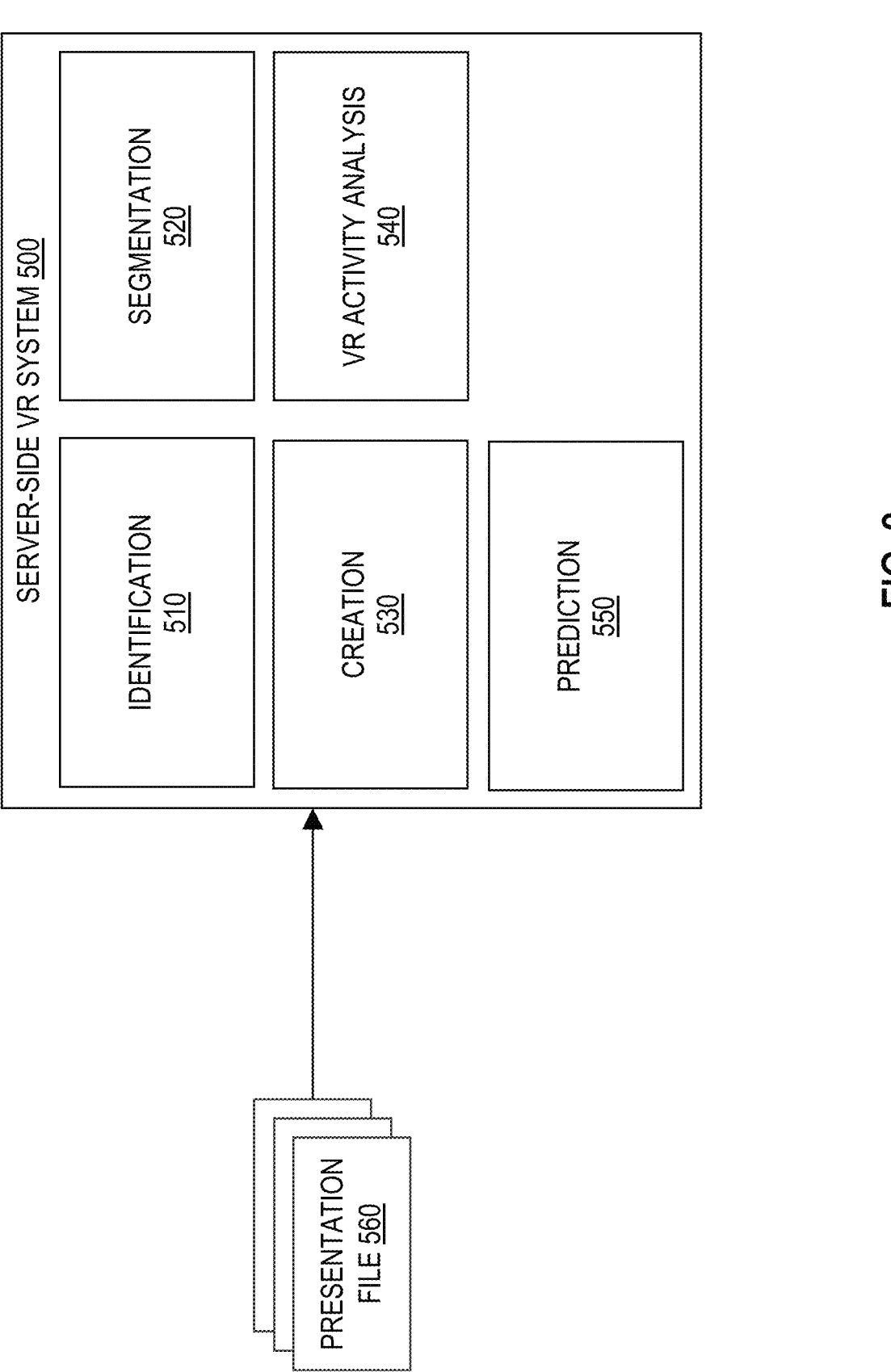
FIG. 3 illustrates a server-side VR system in detail, in accordance with an embodiment of the invention.

FIG. 3 illustrates the server-side VR system 500 in detail, in accordance with an embodiment of the invention. In one embodiment, the server-side VR system 500 comprises an identification unit 510. The identification unit 510 is configured to receive, as input, one or more presentation files 560. A presentation file 560 is presentation content including one or more sections such as, but not limited to, one or more slides or pages. For each presentation file 560 received, the identification unit 510 is configured to: (1) determine metadata corresponding to the presentation file 560, and (2) update metadata information to include the metadata corresponding to the presentation file 560.

In one embodiment, the server-side VR system 500 maintains a database (e.g., on a storage unit 362) comprising metadata information including, for each presentation file 560, metadata corresponding to the presentation file 560.

In one embodiment, to determine metadata corresponding to a presentation file 560, the identification unit 510 is configured to perform the following operations: The identification unit 510 individually identifies each slide or page (i.e., section) of the presentation file 560, identifies a total number of slides or pages of the presentation file 560, and identifies one or more types of content ("content types") included in the presentation file 560. A presentation file 560 may include one or more content types such as, but not limited to, text, audio, video, graphs, images, etc.

Further, for each slide or page (i.e., section) of the presentation file 560, the identification unit 510 identifies each content type included in the slide or page, identifies a presenter assigned to present (i.e., explain or narrate) content of the slide or page, and identifies each topic of information ("information topic") the slide or page covers. A section (e.g., slide or page) of a presentation file 560 may cover one or more information topics such as, but not limited to, a news topic (e.g., finance, sports, etc.), an educational topic (e.g., history, math, etc.), a topic of interest (e.g., music, film, etc.), a research topic (e.g., artificial intelligence, etc.), etc. Multiple slides or pages of a presentation file 560 may cover the same information topic.

Further, the identification unit 510 identifies a break time assigned to the presentation file 560. A break time assigned to a presentation file 560 defines an amount of time to pause at each slide or page of the presentation file 560 before presenting a next slide or page of the presentation file 560. A break time represents a buffer of time intended to provide a user 330 with enough time to digest an information topic covered by a slide or page, and rebuild their attention before viewing a next slide or page.

In one embodiment, metadata corresponding to a presentation file 560 includes, but is not limited to, information identifying a total number of slides or pages of the presentation file 560, a break time assigned to the presentation file 560, each content type included in each slide or page of the presentation file 560, each presenter assigned to present each slide or page of the presentation file 560, and each information topic each slide or page of the presentation file 560 covers, etc.

In one embodiment, the identification unit 510 is configured to adjust a break time assigned to a presentation file 560 based on metadata corresponding to the presentation file 560. For example, if an information topic covered by one or more slides or pages of a presentation file 560 is complex or technical, the identification unit 510 may increase a break time assigned to the presentation file 560 to allow a user 330 more time to digest the information topic.

In one embodiment, the server-side VR system 500 comprises a segmentation unit 520. The segmentation unit 520 is configured to: (1) receive metadata corresponding to a presentation file 560 (e.g., from the identification unit 510), and (2) segment (i.e., divide or partition) one or more slides or pages of the presentation file 560 based on the metadata. For example, in one embodiment, the segmentation unit 520 segments one or more slides or pages of the presentation file 560 based on one or more content types included in the presentation file 560, resulting in different groups of slides or pages for different content types (e.g., a group of slides or pages that include only audio, another group of slides or pages that include only text, etc.).

In one embodiment, the server-side VR system 500 comprises a creation unit 530. The creation unit 530 is configured to: (1) receive metadata corresponding to a presentation file 560 (e.g., from the identification unit 510), (2) based on the metadata, create a VR model corresponding to the presentation file 560, wherein the VR model simulates a presentation of the presentation file 560, and (3) provide a VR environment 400 that includes the VR model for display on one or more VR-enabled devices 320 (e.g., VR headsets 320) of one or more users 330.

In one embodiment, the creation unit 530 creates the VR model corresponding to the presentation file 560 by: (1) creating one or more virtual presentation slides 430 corresponding to one or more slides or pages (i.e., sections) of the presentation file 560, wherein each slide or page of the presentation file 560 has a corresponding virtual presentation slide 430, (2) creating a virtual surrounding area 410 including one or more virtual walls 420, and (3) arranging the one or more virtual presentation slides 430 on the one or more virtual walls 420, such that the one or more virtual presentation slides 430 are distributed across the one or more virtual walls 420 of the virtual surrounding area 410. The VR model comprises a streaming volumetric video including the one or more virtual presentation slides 430 distributed across the one or more virtual walls 420 of the virtual surrounding area 410.

In one embodiment, based on different groups of slides or pages for different content types that the presentation file 560 is segmented into (e.g., via the segmentation unit 520), the creation unit 530 is configured to arrange virtual presentation slides 430 that include the same content type on the same virtual wall 420. For example, all virtual presentation slides 430 that include only text may be arranged on a first virtual wall 420, all virtual presentation slides 430 that include only audio may be arranged on a second virtual wall 420, etc.

In one embodiment, the creation unit 530 further creates the VR model corresponding to the presentation file 560 by creating one or more virtual participant avatars 460 corresponding to one or more virtually present participants (i.e., one or more users 330 simultaneously viewing the VR environment 400). The streaming volumetric video of the VR model further includes the one or more virtual participant avatars 440, wherein each virtual participant avatar 440 is positioned relative to the one or more virtual presentation slides 430.

In one embodiment, the creation unit 530 further creates the VR model corresponding to the presentation file 560 by creating one or more virtual presenter avatars 460 corresponding to one or more presenters assigned to present (i.e., explain or narrate) content of the one or more slides or pages of the presentation file 560. The VR model further includes the one or more virtual presenter avatars 460 that are selectively displayed on a VR interface 450 of the VR environment 400. As described in detail later herein, in response to a user 330 selecting a virtual presentation slide 430 for viewing (i.e., to focus on), the VR interface 450 displays a corresponding virtual presenter avatar 460 for presenting (i.e., explaining or narrating) content of the selected virtual presentation slide 430 to the user 330. In one embodiment, as a virtual presenter avatar 460 is displayed to a user 330, a voice recording is simultaneously played back to the user 330, wherein the voice recording represents a voice of the virtual presenter avatar 460 and provides an explanation or narration.

Each user 330 viewing the VR environment 400 using a VR-enabled device 320 represents a participant who is virtually present at the presentation ("virtually present participant"). In one embodiment, the VR environment 400 includes one or more virtual participant avatars 440. Each virtual participant avatar 440 is a VR object representing a virtually present participant. If there are multiple virtually present participants (i.e., multiple users 330 simultaneously viewing the VR environment 400), the VR environment 400 includes multiple virtual participant avatars 440 representing the virtually present participants.

In one embodiment, to create a virtual surrounding area 410, the creation unit 530 determines a virtual boundary of the virtual surrounding area 410 based on a number of virtual presentation slides 430 to arrange on one or more virtual walls 420 of the virtual surrounding area 410. The virtual boundary defines an amount of virtual area in a VR environment 400 that the virtual surrounding area 410 covers, such that each virtual wall 420 of the virtual surrounding area 410 is within the virtual boundary.

In one embodiment, a virtual surrounding area 410 represents a VR gallery 410 for a particular content type, wherein each virtual presentation slide 430 arranged on each virtual wall 420 of the virtual surrounding area/VR gallery 410 includes the particular content type. For example, in one embodiment, for each content type included in a presentation file 560, the creation unit 530 creates a corresponding virtual surrounding area/VR gallery 410 for the content type. For each slide or page of the presentation file 560 that includes the content type, the creation unit 530 arranges a corresponding virtual presentation slide 430 on a virtual wall 420 of the virtual surrounding area/VR gallery 410.

In one embodiment, the server-side VR system 500 comprises an VR activity analysis unit 540. For each user 330 in a VR environment 400, the VR activity analysis unit 540 is configured to: (1) receive VR interaction data of the user 330 in the VR environment 400, and (2) analyze the VR interaction data to determine a current virtual activity of the user 330 in the VR environment 400 and/or predict a next virtual activity of the user 330 in the VR environment 400. As described in detail herein below, the VR activity analysis unit 540 analyzes the VR interaction data to determine whether the user 330 is idle, viewing a virtual presentation slide 430, communicating with another user 330 (i.e., another virtually present participant), virtually moving towards a virtual presentation slide 430, or virtually moving towards a virtual participant avatar 440 representing another user 330 (i.e., another virtually present participant).

In one embodiment, to determine a current virtual activity of a user 330 in a VR environment 400, the VR activity analysis unit 540 analyzes VR interaction data of the user 330 to determine a VR object in the VR environment 400 the user 330 is currently interacting with (via one or more VR interactions). If the VR object determined is a virtual presentation slide 430, the current virtual activity of the user 330 involves the user 330 currently viewing the virtual presentation slide 430 (i.e., the virtual presentation slide 430 is a current virtual presentation slide 430). The current virtual presentation slide 430 is enlarged/magnified/zoomed in to allow the user 330 to focus on the current virtual presentation slide 430, and a VR interface 450 of the VR environment 400 displays a corresponding virtual presenter avatar 460 for presenting (i.e., explaining or narrating) content of the current virtual presentation slide 430 to the user 330. The user 330 may utilize a note-taking tool provided by the VR environment 400 to take notes. If the VR object determined is a virtual participant avatar 440 instead, the current virtual activity of the user 330 involves the user 330 currently communicating with another virtually present participant (i.e., another user 330) represented by the virtual participant avatar 440. The user 330 can collaborate and discuss with the another virtually present participant via one or more communication channels (e.g., voice, chat, etc.) and/or one or more collaboration tools (e.g., a collaborative whiteboard tool, a note-taking tool).

In one embodiment, to determine a next virtual activity of a user 330 in a VR environment 400, the VR activity analysis unit 540 analyzes VR interaction data of the user 330 to determine a direction (i.e., mobility direction, e.g., north, south, forward, backward, sideways, diagonal, etc.) of a virtual movement of the user 330 in the VR environment 400, and predicts a VR object in the VR environment 400 that the user 330 is approaching (i.e., moving towards) based on the direction. If the VR object predicted is a virtual presentation slide 430, the next virtual activity of the user 330 will involve the user 330 viewing the virtual presentation slide 430 (i.e., the virtual presentation slide 430 is a next virtual presentation slide 430). The VR activity analysis unit 540 proactively prepares the next virtual presentation slide 430 for viewing, such that the next virtual presentation slide 430 will be enlarged/magnified/zoomed in to allow the user 330 to focus on the next virtual presentation slide 430, and a VR interface 450 of the VR environment 400 will display a corresponding virtual presenter avatar 460 for presenting (i.e., explaining or narrating) content of the next virtual presentation slide 430 to the user 330.

If the VR object predicted is a virtual participant avatar 440 instead, the next virtual activity of the user 330 will involve the user 330 communicating with another virtually present participant represented by the virtual participant avatar 440. The VR activity analysis unit 540 proactively opens up one or more communication channels (e.g., voice, chat, etc.) and/or one or more collaboration tools (e.g., a collaborative whiteboard tool, a note-taking tool), such that the user 330 can collaborate and discuss with the another virtually present participant via the one or more communication channels and/or the one or more collaboration tools.

In one embodiment, a user 330 can interact with (via one or more VR interactions) a virtual presentation slide 430 the user 330 is currently viewing to select a portion of the virtual presentation slide 430 to focus on. In response to a user 330 selecting a portion of a virtual presentation slide 430 to focus on, the VR activity analysis unit 540 is configured to trigger a corresponding virtual presenter avatar 460 to present (i.e., explain or narrate) content of the selected portion to the user 330.

In one embodiment, the VR activity analysis unit 540 is configured to: (1) determine a position of a user 330 relative to one or more virtual presentation slides 430 (i.e., relative position of the user 330) in a virtual environment 400 based on a current virtual activity of the user 330, and (2) update a position of a corresponding virtual participant avatar 440 in the virtual environment 400 based on the relative position of the user 330.

For each user 330 viewing a VR environment 400 via a VR-enabled device 320 (e.g., a VR headset 320), the VR environment 400 includes one or more virtual participant avatars 440 corresponding to one or more other virtually present participants (i.e., one or more other users 330 simultaneously viewing the VR environment 400). Each virtual participant avatar 440 in a virtual environment 400 is positioned relative to one or more virtual presentation slides 430 in the virtual environment 400. Therefore, a VR environment 400 enables a user 330 to visualize at least one other virtually present participant and a relative position of the at least one other virtually present participant.

In one embodiment, if two or more users 330 are simultaneously viewing (i.e., focused on) the same virtual presentation slide 430, the users 330 can collaborate and discuss with one another via one or more communication channels (e.g., voice, chat, etc.) and/or one or more collaboration tools (e.g., a collaborative whiteboard tool, a note-taking tool). In one embodiment, the VR activity analysis unit 540 is configured to: (1) determine whether multiple users 330 are simultaneously viewing the same virtual presentation slide 430 in a VR environment 400, and (2) in response to determining the multiple users 330 are simultaneously viewing the same virtual presentation slide 430, providing one or more communication channels (e.g., voice, chat, etc.) and/or one or more collaboration tools (e.g., a collaborative whiteboard tool, a note-taking tool) to facilitate collaboration and discussion between the multiple users 330.

For example, a VR environment 400 that includes virtual participant avatars 440 enables a user 330 to visualize at least one other virtually present participant within proximity of a virtual presentation slide 430 the user 330 is currently viewing (i.e., focused on). The user 330 may virtually interact with a virtual participant avatar 440 positioned within proximity of the virtual presentation slide 430 to initiate collaboration and discussion (e.g., via a communication channel and/or a collaboration tool) with another virtually present participant represented by the virtual participant avatar 440.

In one embodiment, a user 330 can control speed and/or direction of each virtual movement of the user 330 in a virtual environment 400. For example, in one embodiment, the VR activity analysis unit 540 is configured to: (1) receive user input (e.g., a movement-based gesture) from a user 330, wherein the user input is collected by an I/O device 313 and/or detected by a sensor device 314, and (2) adjust speed and/or direction of a virtual movement of the user 330 in a virtual environment 400 based on the user input.

Speed and/or direction of each virtual movement of a user 330 in a virtual environment 400 in turn controls how much time the user 330 wants to spend viewing each virtual presentation slide 430 in the virtual environment 400. For example, an amount of time a user 330 spent viewing a virtual presentation slide 440 is based on how long the user 330 virtually stood in place (i.e., the user 330 paused or performed no virtual movements) to view the virtual presentation slide 440 before the user 330 virtually moved away from the virtual presentation slide 430. As another example, if the user 330 does not want to spend anytime viewing a particular virtual presentation slide 430, the user 330 can perform one or more virtual movements to virtually move past the virtual presentation slide 430, such that the virtual presentation slide 430 is bypassed or skipped. Unlike conventional solutions where all participants at a presentation view the same order of slides or pages of presentation content, the user 330 can view virtual presentation slides in a different order than another user 330.

In one embodiment, for each virtual presentation slide 430, the VR activity analysis unit 540 is configured to track a corresponding amount of time a user 330 spent viewing the virtual presentation slide 430 (i.e., how long the user 330 virtually stood in place to view the virtual presentation slide 430 before the user 330 virtually moved away from the virtual presentation slide 430).

Unlike conventional solutions where all participants at a presentation are allocated the same amount of time to view (i.e., focus on) a slide or page of presentation content, the amount of time a user 330 wants to view (i.e., focus on) a virtual presentation slide 330 can be personalized. For example, a user 330 may spend more time viewing virtual presentation slides 330 with complex information, and may spend less time viewing virtual presentation slides 330 with non-complex information. As another example, a user 330 with a technical background may spend less time viewing virtual presentation slides 330 with complex information, whereas a different user 330 with a non-technical background may spend more time viewing the same virtual presentation slides 330 with complex information.

In one embodiment, the VR activity analysis unit 540 is configured to: (1) determine if a user 330 is idle in a virtual environment 400, and (2) if the user is idle, adjust a break time (e.g., increase the break time), such that presentation of a next presentation slide 430 only commences at the expiration of the adjusted break time. A user 330 is idle in a virtual environment 400 if the user 330 is communicating with another virtually present participant (i.e., another user 330) in the virtual environment 400 and/or the user 330 is virtually standing in place and not viewing a virtual presentation slide 430.

In one embodiment, the VR server-side system 500 comprises a prediction unit 550. The prediction unit 550 is configured to: (1) for each content type included in a presentation file 560, predict an interest level of a user 330 in the content type, and (2) recommend a personalized navigation path for the user 330 based on each predicted interest level, wherein the personalized navigation path represents a recommended order (i.e., sequence) of virtual presentation slides 430 for the user 330 to view, wherein each virtual presentation slide corresponds to a slide or page (i.e., section) of the presentation file 560. For example, if the user 330 has a higher predicted interest level in text compared to video, the personalized navigation path may recommend the user 330 view all virtual presentation slides 430 that include only text first (e.g., virtual presentation slides 430 arranged on a first virtual wall 420), and view all virtual presentation slides 430 that include only video thereafter (e.g., virtual presentation slides 430 arranged on a second virtual wall 420).

Figure 4:
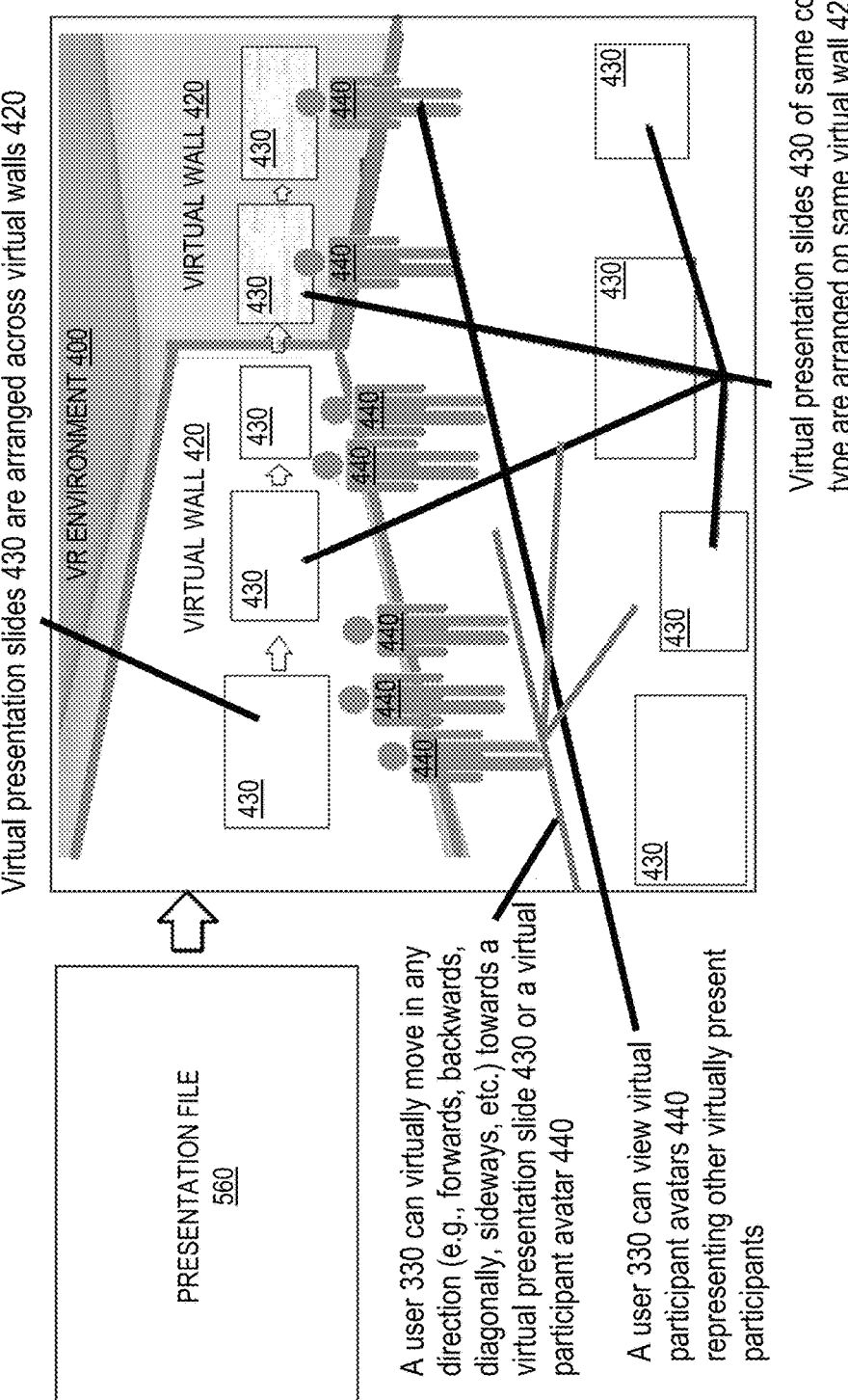
FIG. 4 illustrates an example application use case, in accordance with an embodiment of the invention.

FIG. 4 illustrates an example application use case, in accordance with an embodiment of the invention. As shown in FIG. 4, a VR environment 400 displayed to a user 330 (e.g., via a VR headset 320) includes virtual presentation slides 430 corresponding to slides or pages (i.e., sections) of a presentation file 560. The virtual presentation slides 430 are arranged across virtual walls 420. In one embodiment, all virtual presentation slides 430 including the same content type are arranged on the same virtual wall 420 (e.g., virtual presentation slides 430 including only text arranged on a first virtual wall 420, virtual presentation slides 430 including only video arranged on second virtual wall 420).

As shown in FIG. 4, the VR environment 400 further includes virtual participant avatars 440 representing other virtually present participants. The user 330 can virtually move in any direction (e.g., forwards, backwards, sideways, diagonally, etc.) in the VR environment 400 towards a virtual presentation slide 430 (to view) or a virtual participant avatar 440 (to communicate with a virtually present participant represented by the virtual participant avatar 440).

Figure 5:
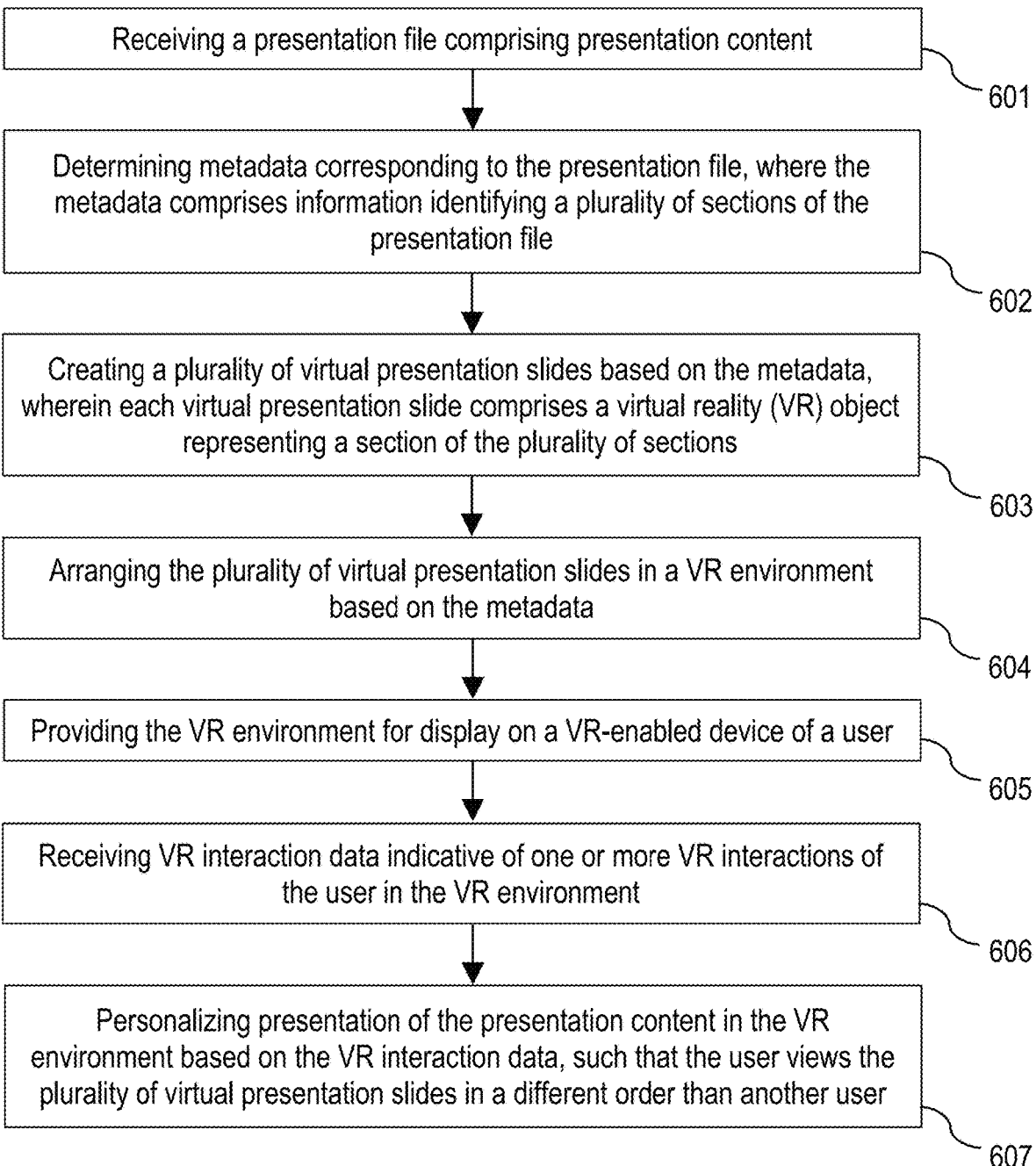
FIG. 5 is a flowchart for an example process for implementing personalized presentation content consumption in a VR environment, in accordance with an embodiment of the invention.

FIG. 5 is a flowchart for an example process 600 for implementing personalized presentation content consumption in a VR environment, in accordance with an embodiment of the invention. Process block 601 includes receiving a presentation file comprising presentation content. Process block 602 includes determining metadata corresponding to the presentation file, wherein the metadata comprises information identifying a plurality of sections of the presentation file. Process block 603 includes creating a plurality of virtual presentation slides based on the metadata, wherein each virtual presentation slide comprises a VR object representing a section of the plurality of sections. Process block 604 includes arranging the plurality of virtual presentation slides in the VR environment based on the metadata. Process block 605 includes providing the VR environment for display on a VR-enabled device of a user. Process block 606 includes receiving VR interaction data indicative of one or more VR interactions of the user in the VR environment. Process block 607 includes personalizing presentation of the presentation content in the VR environment based on the VR interaction data, such that the user views the plurality of virtual presentation slides in a different order than another user.

In one embodiment, process blocks 601-607 are performed by one or more components of the server-side VR system 500.

From the above description, it can be seen that embodiments of the invention provide a system, computer program product, and method for implementing the embodiments of the invention. Embodiments of the invention further provide a computer-useable storage medium for implementing the embodiments of the invention. The computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112(f), unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a presentation file comprising presentation content;
   determining metadata corresponding to the presentation file, wherein the metadata comprises information identifying a plurality of sections of the presentation file and respective ones of presenters assigned to narrate respective ones of sections of the plurality of sections;

creating a plurality of virtual presentation slides based on the metadata, wherein each virtual presentation slide comprises a VR object representing a section of the plurality of sections;

arranging the plurality of virtual presentation slides in a virtual reality (VR) environment based on the metadata;

providing the VR environment for display on a VR-enabled device of a user;

receiving VR interaction data indicative of one or more VR interactions of the user in the VR environment; and personalizing presentation of the presentation content in the VR environment based on the VR interaction data, such that the user views the plurality of virtual presentation slides in a different order than another user.

2. The method of claim 1, wherein each section of the plurality of sections comprises a slide or a page of the presentation file.

3. The method of claim 1, wherein the VR-enabled device comprises a VR headset.

4. The method of claim 1, wherein the metadata further comprises additional information identifying at least one selected from a group consisting of: a total number of the plurality of sections, a break time assigned to the presentation file, each content type included in each section of the plurality of sections, and each information topic each section of the plurality of sections covers.

5. The method of claim 1, further comprising:

creating a plurality of virtual presenter avatars based on the respective ones of presenters assigned to narrate respective ones of sections of the plurality of sections, wherein each virtual presenter avatar comprises a VR object representing a presenter assigned to narrate a section of the plurality of sections, and the virtual presenter avatar corresponds to a virtual presentation slide representing the section; and in response to the user selecting a virtual presentation slide of the plurality of virtual presentation slides to view, displaying a virtual presenter avatar corresponding to the selected virtual presentation slide in a portion of the VR environment.

6. The method of claim 1, further comprising:

determining whether the user and the another user are simultaneously viewing a same virtual presentation slide of the plurality of virtual presentation slides; and in response to determining the user and the another user are simultaneously viewing the same virtual presentation slide, providing at least one of a communication channel or a collaboration tool to facilitate collaboration and discussion between the user and the another user.

7. The method of claim 1, further comprising:

creating a plurality of virtual participant avatars based on the metadata, wherein each virtual participant avatar comprises a VR object representing a virtually present participant viewing the VR environment; and displaying the plurality of virtual participant avatars in the VR environment, wherein a position of each virtual participant avatar in the VR environment adjusts based on a current virtual activity of a virtually present participant that the virtual participant avatar represents.

8. The method of claim 1, wherein the plurality of virtual presentation slides is arranged on a plurality of virtual walls in the VR environment, and all virtual presentation slides that include a same content type are arranged on the same virtual wall.

9. A system comprising:

a processor set;

one or more computer-readable storage media; and program instructions stored on the one or more computer-readable storage media to cause the processor set to perform operations comprising:

receiving a presentation file comprising presentation content;

determining metadata corresponding to the presentation file, wherein the metadata comprises information identifying a plurality of sections of the presentation file and respective ones of presenters assigned to narrate respective ones of sections of the plurality of sections;

creating a plurality of virtual presentation slides based on the metadata, wherein each virtual presentation slide comprises a VR object representing a section of the plurality of sections;

arranging the plurality of virtual presentation slides in a virtual reality (VR) environment based on the metadata;

providing the VR environment for display on a VR-enabled device of a user;

receiving VR interaction data indicative of one or more VR interactions of the user in the VR environment; and personalizing presentation of the presentation content in the VR environment based on the VR interaction data, such that the user views the plurality of virtual presentation slides in a different order than another user.

10. The system of claim 9, wherein each section of the plurality of sections comprises a slide or a page of the presentation file.

11. The system of claim 9, wherein the VR-enabled device comprises a VR headset.

12. The system of claim 9, wherein the metadata further comprises additional information identifying at least one selected from a group consisting of: a total number of the plurality of sections, a break time assigned to the presentation file, each content type included in each section of the plurality of sections, and each information topic each section of the plurality of sections covers.

13. The system of claim 9, wherein the operations further include:

creating a plurality of virtual presenter avatars based on the respective ones of presenters assigned to narrate respective ones of sections of the plurality of sections, wherein each virtual presenter avatar comprises a VR object representing a presenter assigned to explain or narrate a section of the plurality of sections, and the virtual presenter avatar corresponds to a virtual presentation slide representing the section; and in response to the user selecting a virtual presentation slide of the plurality of virtual presentation slides to view, displaying a virtual presenter avatar corresponding to the selected virtual presentation slide in a portion of the VR environment.

14. The system of claim 9, wherein the operations further include:

determining whether the user and the another user are simultaneously viewing a same virtual presentation slide of the plurality of virtual presentation slides; and in response to determining the user and the another user are simultaneously viewing the same virtual presentation slide, providing at least one of a communication channel or a collaboration tool to facilitate collaboration and discussion between the user and the another user.

15. The system of claim 9, wherein the operations further include:

creating a plurality of virtual participant avatars based on the metadata, wherein each virtual participant avatar comprises a VR object representing a virtually present participant viewing the VR environment; and displaying the plurality of virtual participant avatars in the VR environment, wherein a position of each virtual participant avatar in the VR environment adjusts based on a current virtual activity of a virtually present participant that the virtual participant avatar represents.

16. The system of claim 9, wherein the operations further include:

analyzing the VR interaction data to determine whether the user is idle, viewing one of the plurality of virtual presentation slides, communicating with the another user, virtually moving towards one of the plurality of virtual presentation slides, or virtually moving towards a virtual participant avatar representing the another user.

17. The system of claim 9, wherein the plurality of virtual presentation slides is arranged on a plurality of virtual walls in the VR environment, and all virtual presentation slides that include a same content type are arranged on the same virtual wall.

18. A computer program product comprising:

one or more computer-readable storage media; and program instructions stored on the one or more computer-readable storage media to perform operations comprising:

receiving a presentation file comprising presentation content;

determining metadata corresponding to the presentation file, wherein the metadata comprises information identifying a plurality of sections of the presentation file and respective ones of presenters assigned to narrate respective ones of sections of the plurality of sections;

creating a plurality of virtual presentation slides based on the metadata, wherein each virtual presentation slide comprises a VR object representing a section of the plurality of sections;

arranging the plurality of virtual presentation slides in a virtual reality (VR) environment based on the metadata;

providing the VR environment for display on a VR-enabled device of a user;

receiving VR interaction data indicative of one or more VR interactions of the user in the VR environment; and personalizing presentation of the presentation content in the VR environment based on the VR interaction data, such that the user views the plurality of virtual presentation slides in a different order than another user.

19. The computer program product of claim 18, wherein each section of the plurality of sections comprises a slide or a page of the presentation file.

20. The computer program product of claim 18, wherein the operations further include:

creating a plurality of virtual presenter avatars based on the respective ones of presenters assigned to narrate respective ones of sections of the plurality of sections, wherein each virtual presenter avatar comprises a VR object representing a presenter assigned to explain or narrate a section of the plurality of sections, and the virtual presenter avatar corresponds to a virtual presentation slide representing the section; and displaying, in response to the user selecting a virtual presentation slide of the plurality of virtual presentation slides to view, a virtual presenter avatar corresponding to the selected virtual presentation slide in a portion of the VR environment.

* * * * *